United States Patent
Kiyonaga

(10) Patent No.: US 9,228,631 B2
(45) Date of Patent: Jan. 5, 2016

(54) DAMPING VALVE

(71) Applicant: KAYABA INDUSTRY CO., LTD., Tokyo (JP)

(72) Inventor: Takahiro Kiyonaga, Gifu (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/403,596

(22) PCT Filed: Jun. 20, 2013

(86) PCT No.: PCT/JP2013/066945
§ 371 (c)(1),
(2) Date: Nov. 25, 2014

(87) PCT Pub. No.: WO2014/002867
PCT Pub. Date: Jan. 3, 2014

(65) Prior Publication Data
US 2015/0167774 A1   Jun. 18, 2015

(30) Foreign Application Priority Data

Jun. 27, 2012   (JP) .................................. 2012-143931

(51) Int. Cl.
*F16F 9/34* (2006.01)
*F16F 9/348* (2006.01)

(52) U.S. Cl.
CPC ............... *F16F 9/3484* (2013.01); *F16F 9/348* (2013.01); *F16F 9/3485* (2013.01); *F16F 9/3488* (2013.01)

(58) Field of Classification Search
CPC ..... F16F 9/3485; F16F 9/3488; F16F 9/3484; F16F 9/348

USPC ............... 188/322.15, 322.13, 322.14, 282.5, 188/282.8, 316
See application file for complete search history.

(56) References Cited

U.S. PATENT DOCUMENTS

| | | | | |
|---|---|---|---|---|
| 4,352,417 A | * | 10/1982 | Stinson | F16F 9/3485 137/513.5 |
| 4,624,347 A | * | 11/1986 | Mourray | F16F 9/348 137/493.9 |
| 4,953,671 A | * | 9/1990 | Imaizumi | F16F 9/512 188/266.3 |
| 5,316,113 A | * | 5/1994 | Yamaoka | F16F 9/3484 188/282.6 |
| 5,441,133 A | * | 8/1995 | Murakami | F16F 9/348 188/282.5 |
| 6,371,264 B1 | * | 4/2002 | Deferme | F16F 9/516 188/282.6 |

(Continued)

FOREIGN PATENT DOCUMENTS

| | | | |
|---|---|---|---|
| JP | 03199733 A | * | 8/1991 |
| JP | 2000-266103 A | | 9/2000 |

(Continued)

*Primary Examiner* — Thomas J Williams
*Assistant Examiner* — Mariano Sy
(74) *Attorney, Agent, or Firm* — Rabin & Berdo, P.C.

(57) ABSTRACT

A damping valve includes: a valve disc having a port a shaft member provided in the valve disc; an annular leaf valve that is attached to an outer periphery of the shaft member so as to be adjacent to the valve disc; a main valve provided on the outer periphery of the shaft member to be free to move in the axial direction; and an annular plate spring that biases the leaf valve toward the valve disc side. The main valve includes a spring supporting portion that contacts an end surface of the leaf valve and supports a valve disc side end portion of the plate spring, and a tubular collar that extends in the axial direction, and is provided to be free to move in the axial direction relative to the shaft member. The plate spring is attached to an outer periphery of the collar.

4 Claims, 3 Drawing Sheets

(56) References Cited

U.S. PATENT DOCUMENTS

| | | | | |
|---|---|---|---|---|
| 8,042,661 | B2* | 10/2011 | Ota | F16F 9/3485 188/282.5 |
| 8,167,101 | B2* | 5/2012 | Chikamatsu | F16F 9/5126 188/281 |
| 8,919,505 | B2* | 12/2014 | Slusarczyk | F16F 9/512 188/282.5 |
| 9,169,890 | B2* | 10/2015 | Groves | F16F 9/3484 188/322.13 |
| 2009/0090588 | A1* | 4/2009 | Berger | F16F 9/3485 188/322.15 |
| 2015/0159724 | A1* | 6/2015 | Kiyonaga | F16F 9/3485 137/614.16 |

FOREIGN PATENT DOCUMENTS

| JP | 2008-128347 A | 6/2008 |
|---|---|---|
| JP | 2008-151335 A | 7/2008 |
| JP | 2010-071371 A | 4/2010 |
| JP | 2010-169202 A | 8/2010 |
| JP | 2011-064285 A | 3/2011 |
| JP | 2012-092860 A | 5/2012 |

\* cited by examiner

DAMPING VALVE

TECHNICAL FIELD

The present invention relates to a damping valve.

BACKGROUND ART

A damping valve is used in a shock absorber for a vehicle, for example. The damping valve includes an annular leaf valve that opens and closes an outlet end of a port formed in a piston of the shock absorber. A plurality of leaf valves are provided, and the leaf valves are disposed so as to be laminated in an axial direction.

The leaf valve is configured such that an inner peripheral side thereof is fixed and an outer peripheral side thereof deflects. The port of the piston is opened and closed by the outer peripheral side of the leaf valve. When a flexural rigidity of the leaf valve provided in the damping valve is set to be low, a damping force generated at a low piston speed is excessively small. When the flexural rigidity of the leaf valve is set to be high, on the other hand, the damping force generated at medium and high piston speeds is excessively large. It is therefore difficult with the damping valve to achieve passenger comfort in the vehicle in all speed regions.

JP2011-64285A discloses a damping valve including: a leaf valve that opens and closes a port of a piston and includes a plurality of cutouts; a guide member disposed adjacent to the leaf valve in order to fix an inner peripheral side of the leaf valve; a main valve disposed on an outer periphery of the guide member to be free to slide; and a plate spring attached to the outer periphery of the guide member in order to bias the leaf valve to the piston side via the main valve.

In a shock absorber including the damping valve described above, when the piston speed is low, the leaf valve does not deflect, but working oil discharged from the port in the piston passes through the cutouts in the leaf valve so that a comparatively large damping force can be secured. When the piston speed reaches a medium or high speed, a pressure of the working oil passing through the port in the piston acts on the leaf valve so that the outer peripheral side of the leaf valve deflects against a biasing force of the plate spring. As a result, the port opens widely so that the damping force is prevented from becoming excessively large. Thus, an improvement in the passenger comfort of the vehicle can be achieved in accordance with the piston speed.

SUMMARY OF INVENTION

In the damping valve described above, only an outer peripheral edge of an end portion of the plate spring contacts the main valve. Moreover, the main valve is formed from an annular flat plate that is thin in an axial direction. Therefore, when the main valve retreats over the guide member in a direction moving away from the piston, the main valve tilts relative to the guide member. When the main valve tilts in this manner, the biasing force of the plate spring varies in a circumferential direction of the leaf valve such that a flow of working oil flowing through a gap between the leaf valve and the piston is unstable. As a result, variation occurs in the generated damping force.

An object of the present invention is to provide a damping valve with which variation in a damping force generated thereby can be suppressed.

According to an aspect of the present invention, a damping valve includes: a valve disc having a port through which a working fluid passes; a shaft member provided in an axial central portion of the valve disc so as to extend in an axial direction from the valve disc; an annular leaf valve that is attached to an outer periphery of the shaft member so as to be adjacent to the valve disc, and that opens and closes the port; a main valve provided on the outer periphery of the shaft member to be free to move in the axial direction, and disposed adjacent to the leaf valve on an opposite side to the valve disc; and an annular plate spring that biases the leaf valve toward a valve disc side via the main valve. The main valve includes: a spring supporting portion that contacts an end surface of the leaf valve on the opposite side to the valve disc and supports a valve disc side end portion of the plate spring; and a tubular collar that extends in the axial direction from an inner periphery of the spring supporting portion, and is provided to be free to move in the axial direction relative to the shaft member. The plate spring is attached to an outer periphery of the collar.

DESCRIPTION OF EMBODIMENTS

An embodiment of the present invention will be described below with reference to the figures.

Figure 1:
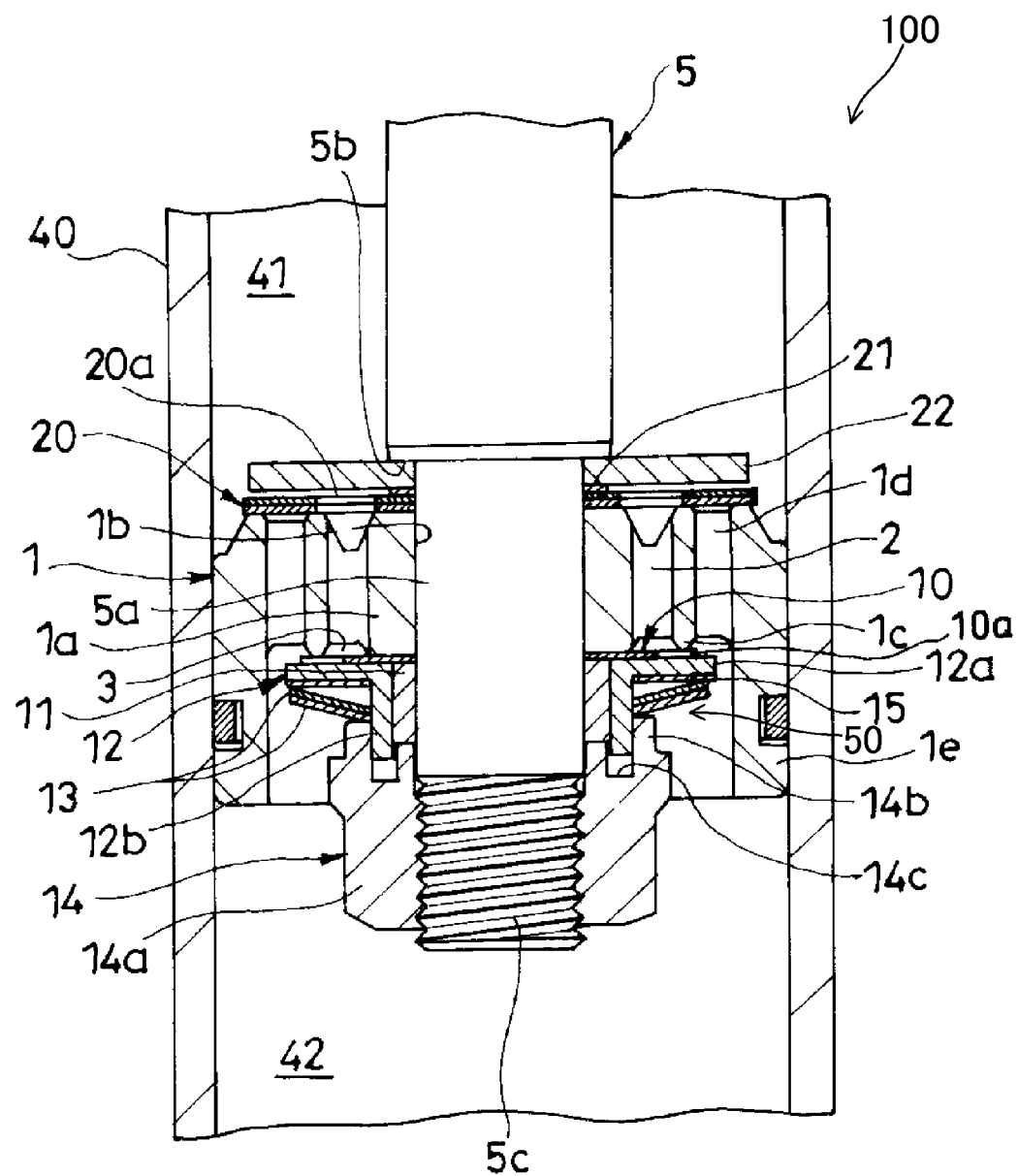
FIG. 1 is a partial longitudinal sectional view of a shock absorber including a damping valve according to an embodiment.

As shown in FIG. 1, a shock absorber 100 includes a tubular cylinder 40, a head member (not shown) that seals an upper end of the cylinder 40, a sealing member (not shown) that seals a lower end of the cylinder 40, a piston rod 5 serving as a shaft member that penetrates the head member to be free to slide, a piston 1 fixed to a tip end 5a of the piston rod 5, and an upper side first chamber 41 and a lower side second chamber 42 formed in the cylinder 40 by the piston 1. Working oil is charged into the cylinder 40 of the shock absorber 100 as a working fluid. It should be noted that the shock absorber 100 also includes a reservoir chamber or an air chamber, not shown in the figures, that compensates for volumetric variation in the cylinder 40 corresponding to a volume by which the piston rod 5 descends into and retreats from the cylinder 40.

The shock absorber 100 includes a damping valve 50. The damping valve 50 is an expansion side damping valve that generates a damping force when the shock absorber 100 expands. The damping valve 50 includes the piston 1 (a valve disc) provided on the tip end 5a of the piston rod 5 serving as the shaft member, ports 2 through which the working oil passes being formed in the piston 1, and an annular leaf valve 10 that is attached to an outer periphery of the tip end 5a so as to be adjacent to the piston 1, and that opens and closes the ports 2. The damping valve 50 also includes a tubular guide member 11 that is attached to the outer periphery of the tip end 5a of the piston rod 5 so as to be adjacent to the leaf valve 10, and formed to have a smaller outer diameter than the leaf valve 10, an annular main valve 12 that is attached to an outer periphery of the guide member 11 to be free to slide in an axial direction and provided adjacent to the leaf valve 10, an annular plate spring 13 attached to the outer periphery of the guide member 11 in order to bias the leaf valve 10 toward the piston 1 side via the main valve 12, and a nut 14 that is screwed to the tip end 5a of the piston rod 5 so as to fix the piston 1 to the tip end 5a.

When the piston 1 moves upward in FIG. 1A relative to the cylinder 40, the damping valve 50 functions as a damping force generating element that causes the shock absorber 100 to generate a predetermined damping force by applying resistance to working oil moving through the ports 2 from the first chamber 41 into the second chamber 42 using the leaf valve 10 such that a predetermined pressure loss is generated.

The piston 1 serving as the valve disc is formed in a closed-end cylindrical shape. The piston 1 includes an insertion hole 1b in an axial central portion of a main body portion 1a thereof, into which the tip end 5a of the piston 5 is inserted, the ports 2 connecting the first chamber 41 to the second chamber 42, and a window portion 3 formed in a lower surface of the main body portion 1a so as to communicate with the ports 2. The piston 1 also includes an annular valve seat 1c formed on an outer side of the window portion 3, which serves as an outlet end of the port 2, so as to project from the main body portion 1a toward the leaf valve 10 side, and a tube portion 1e positioned on an outer side of the valve seat 1c so as to extend in the axial direction. The tube portion 1e of the piston 1 slides against an inner peripheral surface of the cylinder 40.

The Piston 1 also includes contraction sides port 1d that allow the working oil to flow from the second chamber 42 into the first chamber 41 when the shock absorber 100 contracts. The port 1d is provided further toward an outer peripheral side of the main body portion 1a than the expansion side port 2.

In the shock absorber 100, the piston 1 is formed in a closed-end cylindrical shape, and therefore a part or all of valve constituting members such as the leaf valve 10 can be housed in the piston 1 while securing an axial direction sliding length required to avoid shaft deflection relative to the cylinder 40. In this embodiment, a length of the piston 1 from an upper end to a lower end on which the nut 14 is disposed can be shortened, and as a result, a configuration on the periphery of the piston can be reduced in size.

The tip end 5a of the piston rod 5 is inserted into the insertion hole 1b in the piston 1 so that the tip end 5a of the piston rod 5 projects downward from the piston 1. An outer diameter of the tip end 5a of the piston rod 5 is set to be smaller than an outer diameter of a shaft portion on an upper side of the tip end 5a, and therefore a step portion 5b is formed in a boundary position between the upper side shaft portion and the tip end 5a.

An annular valve stopper 22, a spacer 21, an annular check valve 20, and the piston 1 are provided on the outer periphery of the tip end 5a of the piston rod 5 in order from the upper side. The annular leaf valve 10, the guide member 11, the main valve 12, a washer 15, and the plate spring 13 are provided on the outer periphery of the tip end 5a of the piston rod 5 below the piston 1. By screwing the nut 14 to a screw portion 5c formed on the tip end 5a of the piston rod 5, the valve stopper 22, the spacer 21, the check valve 20, the piston 1, the leaf valve 10, and the guide member 11 are sandwiched between the step portion 5b of the piston rod 5 and the nut 14 and thereby fixed to the piston rod 5. The main valve 12, the washer 15, and the plate spring 13 are permitted to move in the axial direction of the piston rod 5 along the guide member 11 between the piston 1 and the nut 14.

In the damping valve 50, an intake side end serving as a lower end of the port 1d is disposed further toward the outer peripheral side than an open end of the port 2 so as not to be closed by the leaf valve 10 provided adjacent to the piston 1. Further, a hole 20a is formed in the check valve 20 to ensure that an intake side end serving as an upper end of the port 2 is not closed. As long as the port 2 is not closed by the check valve 20 and the port 1d is not closed by the leaf valve 10, the ports 2, 1d are not limited to the arrangements and shapes shown in the figures. Therefore, for example, the respective ports 2, 1d may be disposed on an identical circumference, and valve seats may be formed in a so-called petal shape.

The leaf valve 10 is disposed adjacent to a lower side of the main body portion 1a of the piston 1. The leaf valve 10 is formed from an annular flat plate. The leaf valve 10 is attached to the outer periphery of the tip end 5a of the piston rod 5 such that an inner peripheral side of the leaf valve 10 is sandwiched fixedly between the piston 1 and the guide member 11. An outer peripheral side of the leaf valve 10 serves as a free end, and an outer peripheral edge of the leaf valve 10 is configured to be capable of deflecting in the axial direction.

An upper surface of the leaf valve 10 contacts the valve seat 1c of the piston 1, and therefore the open end of the port 2 in the piston 1 is closed. In the damping valve 50, the leaf valve 10 is constituted by a single annular flat plate, but may be constituted by a laminated leaf valve having a plurality of laminated annular flat plates. The number of annular flat plates is set as desired in accordance with a damping characteristic (a relationship between a piston speed and a damping force) required of the shock absorber 100. When a plurality of annular flat plates are laminated, respective outer diameters of the annular flat plates may be varied in accordance with the damping characteristic of the shock absorber 100.

The guide member 11 is formed from a cylindrical member. An outer diameter of the guide member 11 is set to be smaller than the outer diameter of the leaf valve 10. The guide member 11 is attached to the tip end 5a of the piston rod 5, which serves as the shaft member, so as to support the inner peripheral side of the leaf valve 10, and therefore the leaf valve 10 is configured as an outwardly opening valve body that deflects on the outer peripheral side.

The main valve 12 is attached to an outer periphery of the guide member 11 to be free to slide. The main valve 12 includes a spring supporting portion 12a formed as an annular flat plate that supports an upper end (a piston side end portion) of the plate spring 13, and a cylindrical collar 12b that extends in the axial direction from an inner periphery of the spring supporting portion 12a, and is attached to the outer periphery of the guide member 11 to be free to slide.

The main valve 12 is disposed such that the spring supporting portion 12a contacts a lower surface of the leaf valve 10 (an end surface thereof on an opposite side to the piston). Further, the collar 12b is configured to be capable of moving in the axial direction of the piston rod 5 along the guide member 11 so as to guide axial direction movement of the main valve 12.

An axial direction length of the collar 12b is set to be long enough to ensure that the main valve 12 does not tilt relative to the guide member 11 when moving in the axial direction relative to the guide member 11. The main valve 12 is provided such that the spring supporting portion 12a is in surface contact with the lower surface of the leaf valve 10 (the end surface thereof on the opposite side to the piston), thereby supporting the lower surface of the leaf valve 10 from below.

The plate spring 13 is disposed between a lower surface of the spring supporting portion 12a of the main valve 12 and an upper end surface of the nut 14. The spring supporting portion 12a of the main valve 12 supports an upper end of the plate spring 13, and the nut 14 supports a lower end of the plate spring 13. An insertion hole for inserting the collar 12b of the main valve 12 is formed in a central part of the plate spring 13, and the plate spring 13 is attached to an outer periphery of the collar 12b via the insertion hole. Two identically shaped, overlapping plate springs 13 are disposed on the outer periphery of the collar 12b. It should be noted that an optimum number of the plate springs 13 is selected as desired in accordance with the required damping characteristic.

The nut 14 includes a nut main body 14a screwed to the screw portion 5c formed on the outer periphery of the tip end 5a of the piston rod 5, a cylindrical spring support portion 14b formed to project to the piston side from an upper end (a piston side end portion) of the nut main body 14a, and an annular recessed portion 14c formed at an upper end of the nut main body 14a on an inner peripheral side of the spring support portion 14b.

An inner diameter of the spring support portion 14b of the nut 14 is set to be slightly larger than an outer diameter of the collar 12b of the main valve 12. The recessed portion 14c of the nut 14 is formed as an annular groove that can be infiltrated by the collar 12b. Hence, the nut 14 is configured so as not to obstruct the main valve 12 when the main valve 12 retreats in the axial direction away from the piston 1.

By providing the recessed portion 14c in the nut 14, a screwing length of the nut 14 and a stroke length of the main valve 12 can be secured even when the collar 12b is formed on the main valve 12. Further, a length from the piston 1 to the lower end of the nut 14 can be shortened, and therefore a stroke length of the shock absorber 100 need not be sacrificed.

The upper end (the piston side end portion) of the plate spring 13 is supported by the spring supporting portion 12a of the main valve 12, and a lower end (an end portion on the opposite side to the piston) of the plate spring 13 is supported by the spring support portion 14b of the nut 14. The plate spring 13 is interposed between the spring supporting portion 12a of the main valve 12 and the spring support portion 14b of the nut 14 in a compressed condition. The plate spring 13 thus biases the leaf valve 10 toward the piston 1 via the main valve 12.

To adjust the biasing force of the plate spring 13, the washer 15 is provided between the spring supporting portion 12a of the main valve 12 and the upper end of the plate spring 13. In the damping valve 50, the biasing force of the plate spring 13 can be adjusted in accordance with the number of disposed washers 15 and an axial direction length thereof. It should be noted that the biasing force of the plate spring 13 may also be adjusted in accordance with an axial direction length of the guide member 11, an axial direction length of the spring supporting portion 12a of the main valve 12, and so on.

Incidentally, the leaf valve 10 forming the damping valve 50 includes a plurality of cutouts 10a formed from an outer edge toward the inner periphery. The cutouts 10a are formed in the shape of slits.

An outer diameter of the spring supporting portion 12a of the main valve 12 is set to equal or exceed an outer diameter of the valve seat 1c of the piston 1, and therefore the cutouts 10a in the leaf valve 10 are closed by the main valve 12 disposed below the leaf valve 10 except for opening parts thereof positioned on an upper end and the outer edge of the leaf valve 10. The cutouts 10a function as orifices when the leaf valve 10 is seated on the valve seat 1c.

It should be noted that when the leaf valve 10 is a laminated leaf valve formed by laminating a plurality of annular flat plates, cutouts are formed only in the annular flat plate adjacent to the piston 1, and from the second annular flat plate onward, counting from the piston 1 side, no cutouts are provided in the annular flat plates. Instead of providing the cutouts 10a in the leaf valve 10, orifices may be punched into the valve seat 1c.

Next, actions of the damping valve 50 of the shock absorber 100 will be described.

In the shock absorber 100 shown in FIG. 1, when the piston 1 moves upward through the cylinder 40, the pressure in the first chamber 41 increases such that the working oil in the first chamber 41 attempts to move into the second chamber 42 through the ports 2.

When the piston speed, i.e. an expansion and contraction speed of the shock absorber 100, is low, the outer peripheral part of the leaf valve 10 cannot deflect against the biasing force of the plate spring 13, and therefore the ports 2 remain closed by the leaf valve 10 that is biased by the plate spring 13. Hence, the working oil discharged from the first chamber 41 is led into the second chamber 42 through the cutouts 10a formed in the leaf valve 10 seated on the valve seat 1c. The cutouts 10a in the leaf valve 10 function as orifices, and therefore resistance is applied to the working oil passing through the cutouts 10a.

Figure 2:
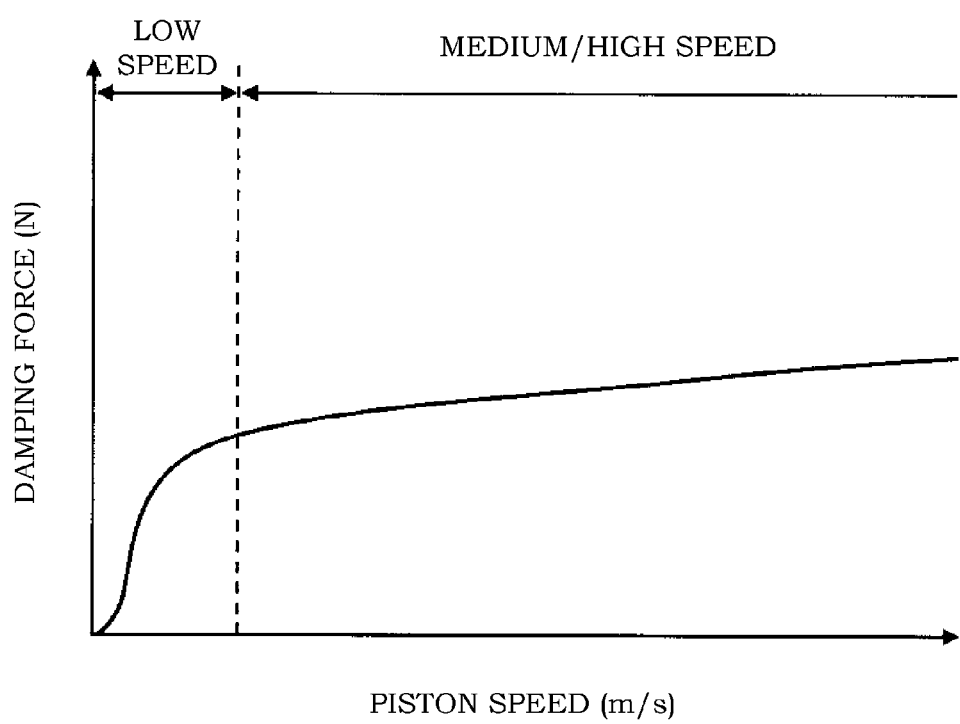
FIG. 2 is a view showing an expansion side damping characteristic of the shock absorber including the damping valve according to this embodiment.

When the piston speed is in a low speed region, the damping characteristic (the relationship between the piston speed and the damping force) of the damping valve 50 is as shown by a solid line in FIG. 2, according to which the damping force increases rapidly as the piston speed increases. In other words, a damping coefficient is set to be comparatively large in the low speed region.

When, on the other hand, the piston speed reaches a medium or high speed such that a difference between the pressure in the first chamber 41 and the pressure in the second chamber 42 increases, a force generated by the working oil for pushing the leaf valve 10 downward increases. When this push-down force overcomes the biasing force of the plate spring 13 such that the outer peripheral side (an outer peripheral edge) of the leaf valve 10 deflects, the ports 2 are opened.

When the leaf valve 10 deflects, a gap is formed between the valve seat 1c and the leaf valve 10 such that the ports 2 open. The gap between the valve seat 1c and the leaf valve 10 increases in proportion with the piston speed. Hence, when the piston speed is in a medium and high speed region, the damping characteristic of the damping valve 50 is as shown by the solid line in FIG. 2, according to which the damping force increases in proportion with the piston speed but at a lower increase rate than in the low speed region. In other words, in the medium and high speed region, an incline of the damping characteristic is small, and therefore the damping coefficient is smaller than that of the low speed region.

In the damping valve 50 according to this embodiment, the plate spring 13 is used instead of a coil spring as the member that biases the leaf valve 10. With the plate spring 13, the axial direction length of the member can be shortened in comparison with a coil spring, and therefore a sufficient deflection amount can be secured reliably in the leaf valve 10. Accordingly, the damping coefficient when the piston speed is in the medium and high speed region can be reduced, and as a result, passenger comfort in a vehicle is not impaired in any speed regions.

In the damping valve 50, the main valve 12 includes the collar 12b, and the collar 12b guides the axial direction movement of the main valve 12 by sliding against the guide member 11 functioning as a shaft member. Hence, the main valve 12 does not tilt relative to the guide member 11 and the tip end 5a of the piston rod 5 when the main valve 12 retreats so as to separate from the piston 1, and therefore the biasing force of the plate spring 13 can be applied evenly in a circumferential direction of the leaf valve 10. As a result, the gap formed between the leaf valve 10 and the valve seat 1c of the piston 1 does not vary every time the ports 2 open and close, and therefore the damping force is generated in the damping valve 50 with stability. According to the damping valve 50, therefore, variation in the damping force generated thereby can be suppressed.

In the damping valve 50, the plate spring 13 is attached to the outer periphery of the collar 12b of the main valve 12, and therefore the length from the piston 1 to the nut 14 can be shortened even when the collar 12b is provided. Further, the plate spring 13 and the main valve 12 can be attached to the tip end 5a of the piston rod 5 after attaching the plate spring 13 to the collar 12b of the main valve 12, and therefore the plate spring 13 does not shift during an attachment process. As a result, the attachment operation can be performed easily.

In the damping valve 50, the recessed portion 14c is provided in the nut 14, and therefore the screwing length of the nut 14 and the stroke length of the main valve 12 can be secured even when the collar 12b is provided on the main valve 12. Further, the length from the piston 1 to the lower end of the nut 14 can be shortened, and therefore the stroke length of the shock absorber 100 need not be sacrificed.

An embodiment of the present invention was described above, but the above embodiment is merely one example of an application of the present invention, and the technical scope of the present invention is not limited to the specific configurations of the above embodiment.

Figure 3:
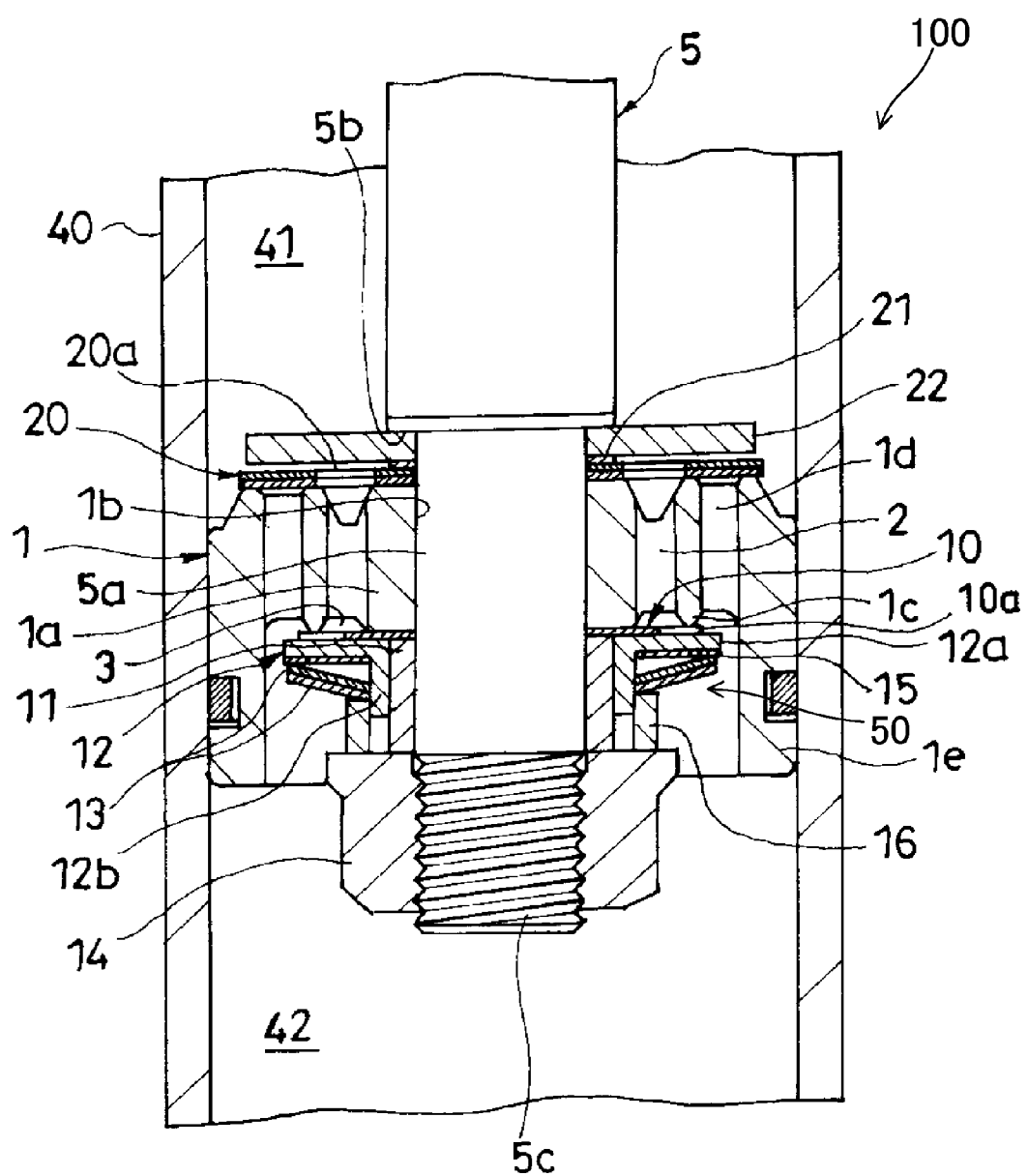
FIG. 3 is a partial longitudinal sectional view of a shock absorber including a damping valve according to a modified example of this embodiment.

In the damping valve 50 according to this embodiment, the spring support portion 14b is provided on the nut 14. However, as in the damping valve 50 shown in FIG. 3, a spring support member 16 may be provided as a separate member to the nut 14. The spring support member 16 is a cylindrical member attached to the outer periphery of the collar 12b of the main valve 12. An upper end of the spring support member 16 supports the lower end of the plate spring 13, and a lower end of the spring support member 16 contacts the nut 14. An inner diameter of the spring support member 16 is set to be slightly larger than the outer diameter of the collar 12b of the main valve 12. Hence, likewise with the damping valve 50 including the spring support member 16 as a separate member, similar effects to those of the damping valve shown in FIG. 1 can be obtained. It should be noted, however, that when the spring support portion 14b is provided integrally with the nut 14, as shown in FIG. 1, the spring support portion 14b does not separate from the nut 14 when the main valve 12 moves in the axial direction or when vibration is input therein. Accordingly, the spring support portion 14b does not collide with the nut 14 and so on, and as a result, excessive noise is not generated.

In this embodiment, the guide member 11 is attached to the outer periphery of the piston rod 5 serving as the shaft member so as to support the inner periphery of the leaf valve 10. However, the guide member 11 may be omitted, and instead, the main valve 12 and the plate spring 13 may be attached directly to the outer periphery of the tip end 5a of the piston rod 5. In this case, when the plate spring 13 contracts in the axial direction such that the main valve 12 retreats from the piston 1, the leaf valve 10 retreats from the piston 1 together with the main valve 12. Likewise with this configuration, variation in the damping force generated by the damping valve 50 can be suppressed.

Further, in the embodiment, the tip end 5a of the piston rod 5 serves as the shaft member, but a different shaft member to the piston rod 5 may be provided directly on the piston 1 serving as the valve disc.

In the embodiment, the damping valve 50 is an expansion side damping valve provided in the piston part of the shock absorber 100, but may be a contraction side damping valve provided in the piston part or a damping valve incorporated into a base valve.

This application claims priority based on Japanese Patent Application No. 2012-143931, filed with the Japan Patent Office on Jun. 27, 2012, the entire contents of which are incorporated into this specification by reference.

The invention claimed is:

1. A damping valve comprising:
a valve disc having a port through which a working fluid passes;
a shaft member provided in an axial central portion of the valve disc so as to extend in an axial direction from the valve disc;
an annular leaf valve that is attached to an outer periphery of the shaft member so as to be adjacent to the valve disc, and that opens and closes the port;
a tubular guide member attached to the outer periphery of the shaft member adjacent to the leaf valve on an opposite side to the valve disc so as to support an inner peripheral side of the leaf valve, an outer diameter of the guide member being set to be smaller than an outer diameter of the leaf valve,
a main valve provided on the outer periphery of the guide member to be free to move in the axial direction, and disposed adjacent to the leaf valve on the opposite side to the valve disc;
an annular plate spring that biases the leaf valve toward the valve disc via the main valve; and
a spring support portion that supports an end portion of the plate spring on an opposite side to the valve disc,
wherein the main valve includes a spring supporting portion that contacts an end surface of the leaf valve on the opposite side to the valve disc and supports a valve disc side end portion of the plate spring, and a tubular collar that extends in the axial direction along the guide member from an inner periphery of the spring supporting portion,
the plate spring is attached to an outer periphery of the collar,
the spring support portion is formed in a tubular shape having an inner diameter that is set to be larger than an outer diameter of the collar, and
the collar is disposed to be free to move in the axial direction between the outer periphery of the guide member and an inner periphery of the spring support portion.

2. The damping valve as defined in claim 1,
further comprising a nut screwed to the shaft member,
wherein the spring support portion is provided integrally with the nut.

3. The damping valve as defined in claim 2,
wherein a recessed portion is provided in the nut on an inner peripheral side of the spring support portion, and the collar is permitted to infiltrate the recessed portion.

4. The damping valve as defined in claim 1, further comprising a nut screwed to the shaft member,
wherein one end of the spring support portion supports an end portion of the plate spring on the opposite side to the valve disc, and another end thereof is disposed in contact with the nut.

* * * * *